(12) United States Patent
Zurfluh

(10) Patent No.: US 6,357,758 B1
(45) Date of Patent: Mar. 19, 2002

(54) METAL GASKET AND METHOD OF MANUFACTURING

(75) Inventor: Thomas O. Zurfluh, Evanston, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/344,282

(22) Filed: Jun. 30, 1999

(51) Int. Cl.[7] .......................... F02F 11/00; B21D 53/84; C21D 6/00
(52) U.S. Cl. ...................... 277/595; 277/951; 29/888.3; 148/661
(58) Field of Search ....................... 29/888.3; 72/342.5; 148/648, 654, 661, 662, 663, 902, 660; 277/951, 593, 595, 591–601

(56) References Cited

U.S. PATENT DOCUMENTS

| | | |
|---|---|---|
| 4,196,913 A | 4/1980 | Oka |
| 4,721,315 A | 1/1988 | Ueta |
| 4,859,542 A * | 8/1989 | Begg et al. ............... 428/547 |
| 4,911,625 A * | 3/1990 | Begg et al. ............... 419/9 |
| 5,209,504 A * | 5/1993 | Udagawa et al. .......... 277/235 |
| 5,294,135 A * | 3/1994 | Kubouchi et al. ......... 277/235 |
| 5,310,196 A * | 5/1994 | Kawaguchi et al. ....... 277/235 |
| 5,460,387 A | 10/1995 | Miyaoh et al. |
| 5,580,065 A | 12/1996 | Ueta |
| 5,695,200 A | 12/1997 | Diez et al. |
| 5,695,203 A * | 12/1997 | Udagawa .................. 277/235 |
| 5,700,016 A | 12/1997 | Miyaoh et al. |
| 5,725,223 A | 3/1998 | Yamada et al. |
| 5,727,795 A | 3/1998 | Plunkett |
| 5,840,136 A * | 11/1998 | Maruki et al. |
| 5,873,577 A * | 2/1999 | Inamura ................... 277/594 |

FOREIGN PATENT DOCUMENTS

| | | |
|---|---|---|
| EP | 528 698 B1 | 2/1993 |
| JP | 403234974 A * | 10/1991 |
| WO | PCT/GB96/01233 | 5/1996 |

OTHER PUBLICATIONS

The Making, Shaping and Treating of Steel, By J. M. Camp and C. B. Francis, Fourth Edition.*

* cited by examiner

Primary Examiner—Anthony Knight
Assistant Examiner—Vishal Patel
(74) Attorney, Agent, or Firm—Reising, Ethington, Barnes, Kisselle, Learman & McCulloch, P.C.

(57) ABSTRACT

A metal gasket for use in sealing between a cylinder head and a block of an engine includes at least one layer formed with at least one opening therethrough and a deformation feature in the form of a sealing bead, stopper, or both surrounding the opening. The gasket layer is fabricated of austemper-hardenable steel formed when in an annealed state and thereafter austempered to harden the layer and relieve residual forming stresses. During austempering, the layer is supported in a porous fixture that retains the layer against movement out of its plane while permitting it to move within its plane. The fixture has coarse expanded metal exoskeleton liner with wire mesh panels. The mesh liners maintain molten salt against the layers which acts as a thermal cushion to discourage warpage.

16 Claims, 3 Drawing Sheets

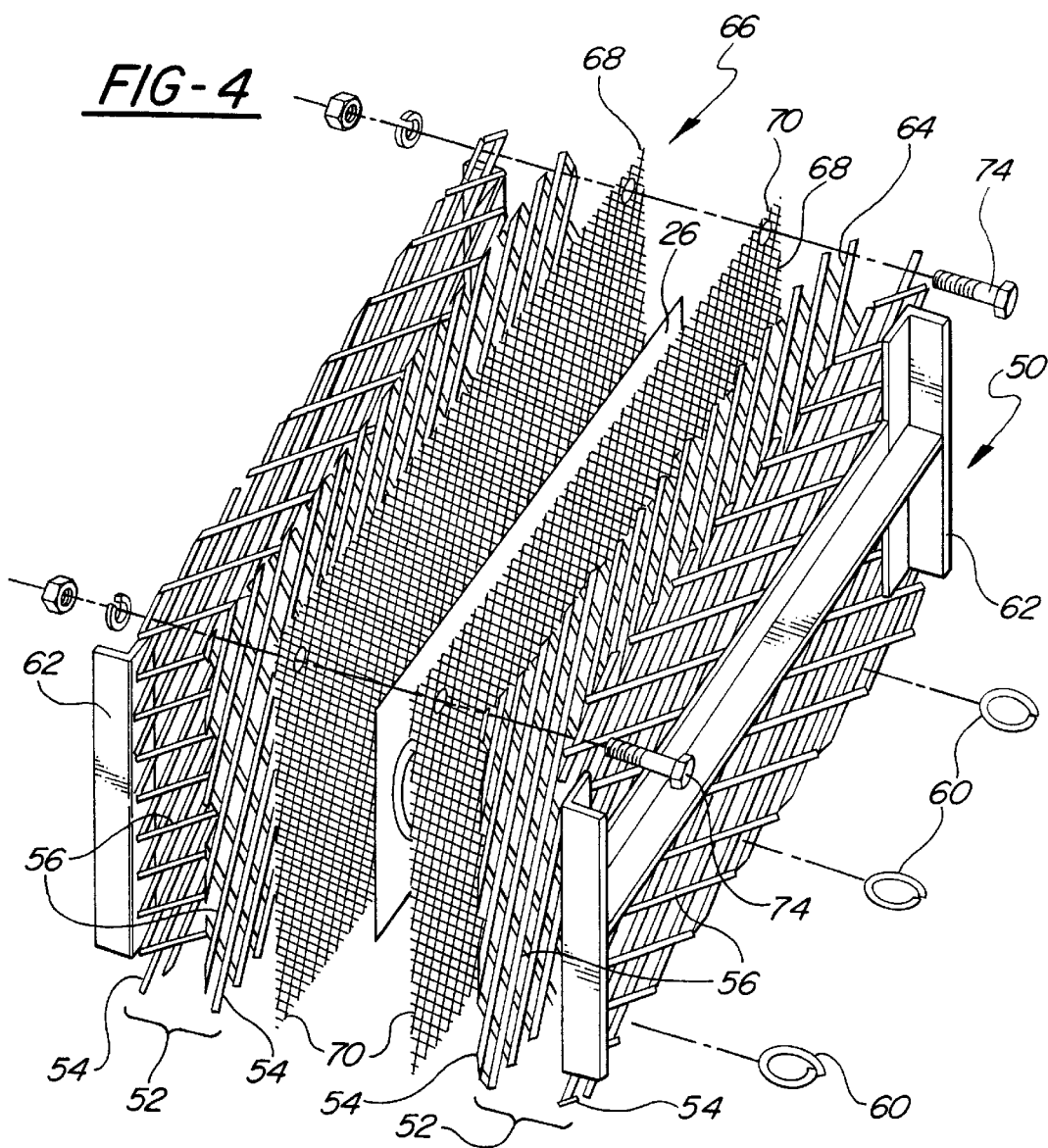
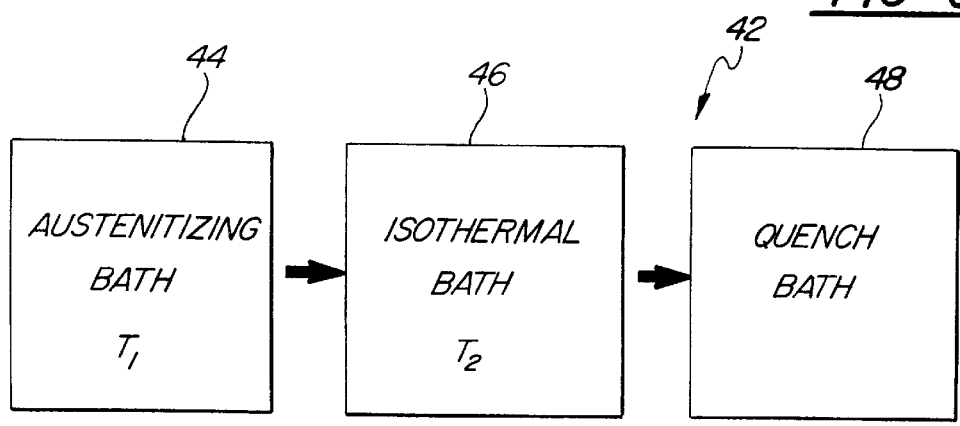

METAL GASKET AND METHOD OF MANUFACTURING

BACKGROUND OF THE INVENTION

1. Technical Field

This invention relates to metal gaskets and to methods of their manufacture.

2. Related Prior Art

Metallic gaskets are widely used in internal combustion engine applications to seal the gap between the joining deck surfaces of the cylinder heads and block to prevent leakage of fluids such as combustion gases, oil, coolant, and the like. The gaskets typically are constructed from several individual metal layers formed with the appropriate openings and sealing features. The layers are laminated to yield a resiliently compressible, multi-layer structure. The outer active layers are typically formed with annular embossed beads that are compressed between the head and block and undergo elastic deformation to assure that a seal is maintained.

The material for the active layers must be ductile enough to allow for initial formation of the beads, yet sufficiently hard and strong in use to withstand considerable loading and deformation without cracking or yielding plastically. Operating conditions of an engine can also produce large planar (lateral) motions and major vertical deformations of the gasket due to thermal changes, particularly during engine start-up. Ongoing combustion can produce both rapid cyclic lateral and vertical movements of the gasket.

Roll hardened stainless steels of the 300 series, and principally 301 full hard stainless, is often used as the material for the active layers. The full hard stainless materials possess the hardness and strength required for the active gasket layers. However, beginning with a full hard material presents difficulties in forming the sealing beads. The thickness of the material and the height of the bead embossments is limited because of the larger press tonnages required to form the embossments. Consequently, full hard active layers are typically made very thin (i.e., on the order of about 0.010") and the embossments modest, requiring multiple layers to make up the needed thickness and compressibility of the gasket. Furthermore, deforming such full hard material introduces localized residual forming stresses and increases the hardness in the vicinity of the embossments, which can contribute to fatigue failure of the gasket if not controlled.

Some gaskets incorporate a stopper to limit the compression of the beads. The full hard materials used for the active layers are generally considered too hard to accommodate the formation of deformed stopper features in the full hard active layers. The stopper features are often formed in a separate stopper layer fabricated typically of low carbon steel, which is readily formable to accommodate the stopper, but has insufficient hardness and strength needed for an active layer.

U.S. Pat. No. 4,721,315 discloses a multi-layer gasket that is silent as to the layer materials. The construction employs a base layer formed with embossed bead and includes another layer attached to the base layer that serves as a spacer (stopper). U.S. Pat. No. 4,196,913 discloses an early multi-layer gasket having layers formed by punching a hard, thin metal plate such as a stainless, carbon or spring steel. There is no disclosure as to how the materials are hardened, other than the disclosure that the materials are hard at the time of punching the embossments or undulations in the gasket layers. Presumably, the materials are cold rolled hardened sheet stock. Such pre-hardened materials would share the same difficulties and limitations discussed above with respect to the current full hard stainless materials.

U.S. Pat. No. 5,310,196 discloses a single layer metal gasket fabricated of specified materials that can be formed in their soft state and then heat treated to achieve a desired hardness. The disclosure is silent as to how the heat treatment processes could be carried out in a way that would preserve the dimensional stability of the gasket layers, which by their nature are extremely thin and have considerable surface area that would make them subject to warpage if heat treated improperly. Specifically, the disclosure does not teach or suggest austempering steels as a viable, dimensionally stable alternative to roll hardened stainless steel gasket layers.

SUMMARY OF THE INVENTION

According to the invention, a metal gasket is provided having at least one layer formed with a plurality of openings and sealing bead deformations surrounding at least one of the openings. The gasket is characterized by the layer being fabricated from austemper-hardenable steel having a generally bainitic microstructure.

According to a method of the invention for forming metal gaskets having at least one layer fabricated from austemper-hardenable steel, the layer is first formed with a plurality of openings and deformed to include sealing beads when the material is in a relatively soft, pre-heat treat hardened condition, and thereafter the gasket layer is austempered to achieve a generally bainitic microstructure harden and strengthen the material while maintaining dimensional stability of the layer.

The invention has the advantage of providing a practical, viable alternative to the use of conventional roll hardened stainless steel gasket layers. Austempering makes possible and practical the use of an inexpensive family of steels that can be formed when in a soft condition to decrease the tonnages and cost of forming beads. Following deformation, the material can be austempered to achieve a high hardness and strength comparable or exceeding that of conventional roll hardened materials and a fatigue strength that is considerably greater (fatigue strength equal to about ½ of tensile strength for austempered layer as compared to ⅓ the tensile strength for roll hardened stainless steel materials.

The austempered gasket layer may be used alone in a single layer metal gasket application or as one or more layers in a multi-layer gasket application.

THE DRAWINGS

These and other features and advantages of the present invention will become more readily appreciated by those skilled in the art when considered in connection with the following detailed description and drawings, wherein:

FIG. 4 is a perspective view of a fixture for use in heat treat hardening gaskets according to the invention;

FIG. 5 is a schematic elevation view of a heat treat apparatus for austempering gaskets according to the invention;

DETAILED DESCRIPTION OF THE PREFERRED EMBODIMENTS

Figure 1:
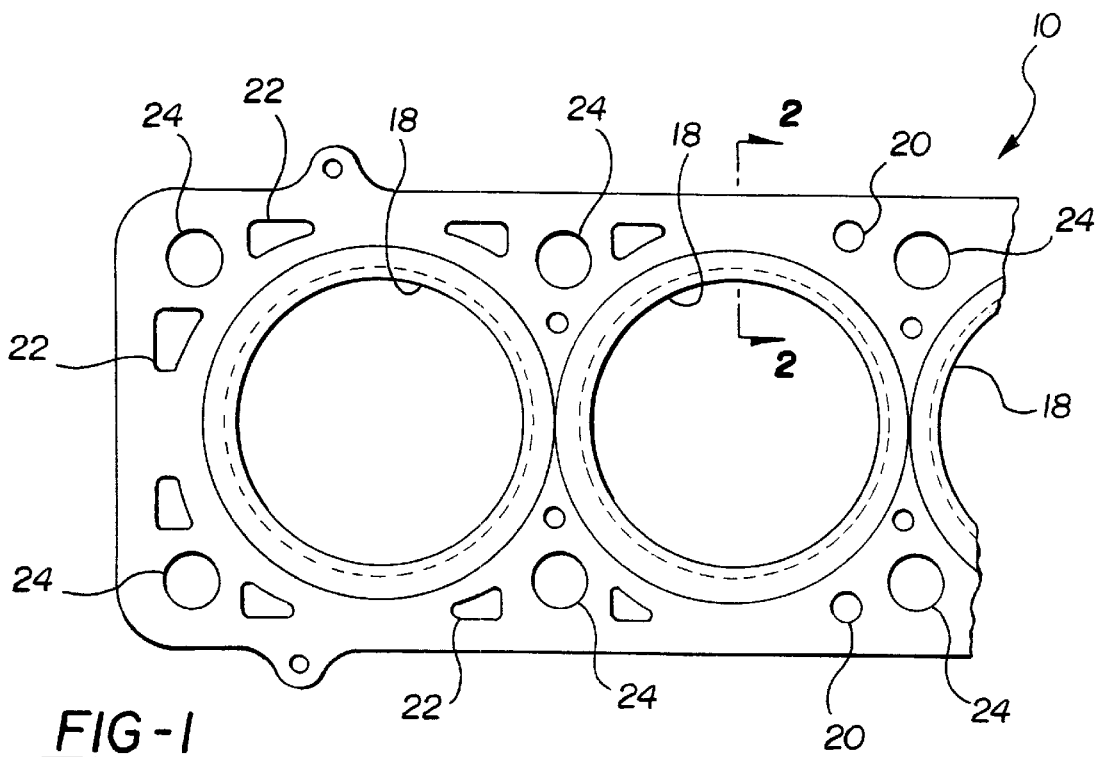
FIG. 1 is a fragmentary plan view of a metal gasket constructed according to the invention.
Figure 2:
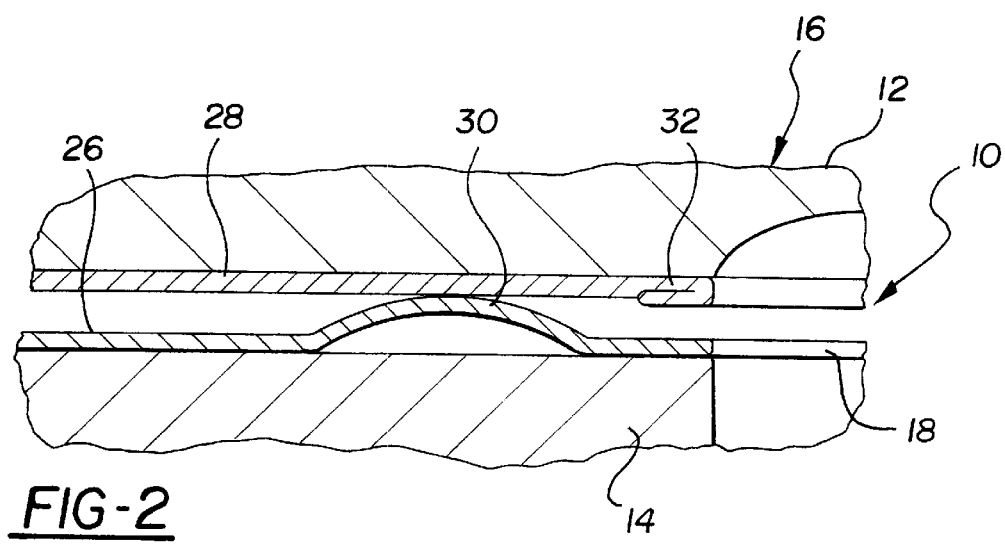
FIG. 2 is an enlarged cross-sectional view taken generally along lines 2—2 of FIG. 1.

Turning now in more detail to the drawings, FIG. 1 illustrates a metal gasket 10 constructed according to the invention for use in sealing the gap between mating surfaces of two stationary components, such as a cylinder head 12 and a cylinder block 14 of an internal combustion engine 16 as illustrated in FIG. 2, to prevent the leakage of fluids communicating therebetween.

The gasket 10 is formed with at least one and preferably a plurality of openings, including a plurality of cylinder openings 18 corresponding to the piston cylinder bores of the engine 16 on which the gasket 10 is to be installed, oil and coolant openings 20, 22 to accommodate the passage of oil and coolant through the gasket 10 between the head 12 and block 14, and a number of bolt holes 24 for receiving bolts (not shown) used for clamping the head 12 to the block 14 and compressing the gasket 10 therebetween to perfect a fluid-tight seal.

Metal gaskets constructed according to the invention may be fabricated from single or multiple layers of austemper-hardenable steel. Such steels have the distinguishing characteristic of being able to be isothermally transformed at a temperature below that of pearlite formation and above that of martensite formation to yield a microstructure that is substantially bainitic. The heat treatment process generally involves first heating the gasket layer of such material to the austenitizing range (typically in the range of about 1450–1600° F.), and then rapidly quenching the layer in a molten salt bath maintained at a constant austempering temperature (typically in the range of about 500–750° F.) and allow holding for sufficient time to allow the austenite to transform to bainite.

Gasket layers fabricated of such material have several advantages over full hard stainless steels (such as 301SS) commonly used in multilayer gasket applications, and quenched and tempered (Q&T) materials. Austempered gasket layers possess high hardness that is comparrable to or exceeds that of full hard layers (in the range of about HRC 37–55), increased level of ductility or notch toughness for a given hardness as compared to full hard layers and Q&T structures (impact strength 40–45 ft.lb for austempered vs. 12–14 for Q&T), tensile strength in the range of about 1300–1800 Mpa, increased fatigue strength (equal to about ½ that of the tensile strength for austempered vs. ⅓ for full hard stainless steels), reduced distortion of the parts as compared to Q&T materials, and a relatively short two-step austempering heat treat cycle as compared to a three step Q&T process with resulting savings in energy and capital investment.

Figure 7:
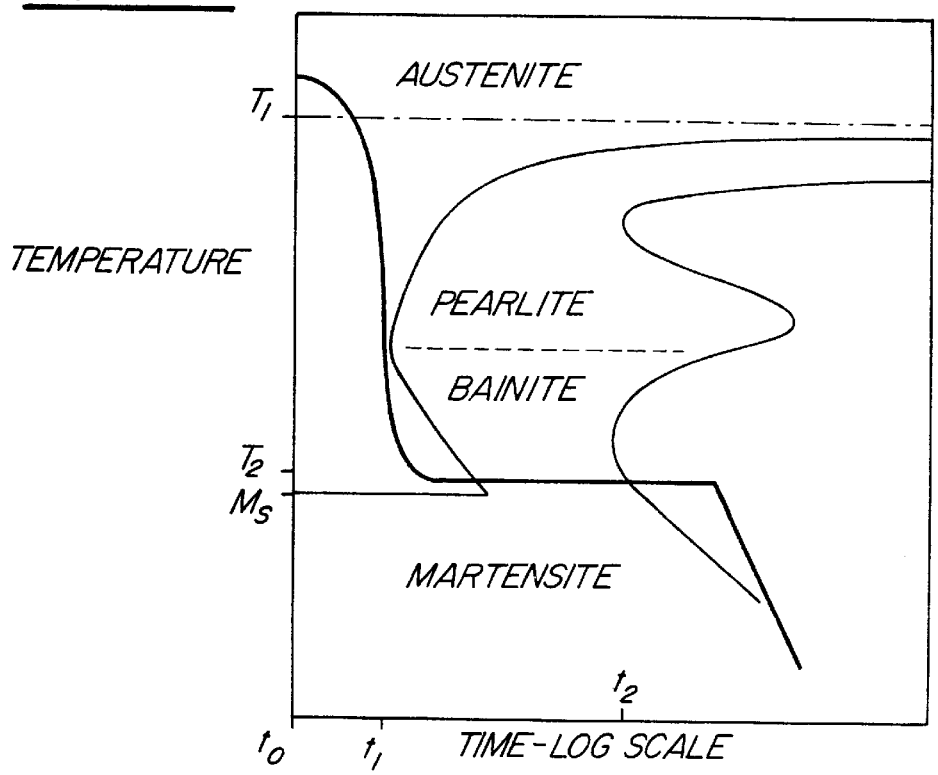
FIG. 7 is a TTT diagram of a representative austemper-hardenable steel for use in the invention.

The selection of steel for austempering is based largely on the time-temperature-transformation (TTT) characteristics of the particular material. FIG. 7 illustrates a schematic TTT diagram for a representative austemper-hardenable steel showing characteristics which favor austempering for candidate steels. Important considerations in the selection of austemper-hardenable steels include (a) the location of the nose of the TTT curve and the time available for bypassing it, and (b) the time available for complete transformation of austenite to bainite at the austempering temperature.

A representative cooling curve for achieving austempering is also shown on the TTT diagram of FIG. 7. The gasket layer of austemper-hardenable steel is initially heated to the austenitizing temperature $T_1$ and held for a sufficient time to austenitize the material at the commencement of the heat treat cycle, $t_0$. The austentized layer is then rapidly quenched from the austenitizing temperature $T_1$ to the austempering temperature $T_2$ in sufficient time $t_0$–$t_1$ bypass the nose of the TTT curve. The layer is held at the austenitizing temperature $T_2$ for sufficient time $t_1$–$t_2$ to achieve isothermal transformation of the austenite to bainite. Upon complete or nearly complete transformation, the layer is cooled to room temperature.

It will be seen from the TTT diagram of FIG. 7 that the nose of the TTT curve is to the right of time zero $t_0$ at time $t_1$ with there being sufficient time $t_0$–$t_1$ (on the order of 2–10 seconds) in which to cool the layer to the austempering temperature $T_2$ quickly enough to bypass the nose of the TTT curve, preventing the transformation of austenite to pearlite that occurs above the nose. It will also be seen that the time for complete transformation to bainite, $t_1$–$t_2$ is within a reasonable time frame for production considerations (i.e., on the order of a few minutes to a several minutes, as opposed to several hours to several days which would be impractical).

Materials that would not be suitable candidates for austemper-hardenable steels of the invention include those in which the nose of the TTT curve is too far left so as to provide too little or no time for bypassing the nose of the TTT curve on cooling, and those with an extremely long transformation time for completion.

Examples of commercially available austemper-hardenable SAE grades of steel that are suitable candidate materials for the gasket layers of the invention include (a) generally, plain carbon steels having a carbon content between 0.50 to 1.00 wt %, including 1050, 1074, 1080, and 1095, (b) generally, high carbon steels having a carbon content exceeding 0.90 wt % and having about 0.60 Mn or a little less, (c) generally, carbon steels having a carbon content less than 0.50 wt % but with a Mn content in the range from about 1.00 to 1.65 wt %, (d) generally, low alloy steels containing more than 0.30 wt % carbon such as 1141 and 1144; the series 1300 to 4000 with carbon contents in excess of 0.40 wt %, and (e) other steels such as low alloy spring steels, 4140, 4340, 52100, 6145, 9440, 410SS, and 420SS. It is to be understood that the above list is not inclusive of the possible austemper-hardenable materials that can be employed.

FIG. 2 illustrates a multi layer embodiment of the invention having, for purposes of illustration, two layers, namely an active layer 26 and a stopper layer 28. The invention contemplates the use of the subject austemper-hardenable steel material in any current or yet-to-be developed multi layer gasket constructions in lieu of conventional full hard stainless steel materials or the like.

In the illustrated embodiment of FIG. 2, at least the active layer 26 is fabricated of the subject austemper-hardenable steel. The layer 26 comprises a thin, flat, generally planer structure having a thickness of about 0.01 inches and including at least one and preferably a plurality of ridge-like embossments or sealing beads 30 circumscribing at least the cylinder openings 18, as is usual for metal gaskets.

According to the invention, the various openings, including the cylinder openings 18, and embossments 30 are formed in the layer 26 when the austemper-hardenable material is in a soft, readily formable pre-austempered condition. The sheet material for the layer 26 is supplied or treated so that it is fully or near fully annealed prior to the performance of any deforming operations of the layer 26, including deformation of the sealing beads 30. The material in its annealed condition is comparatively soft, having a hardness in the area of about the HRB 80's (as compared to the full hard starting material for conventional stainless steel gasket layers). The material is readily deformable under comparably low coining forces in relation to the force needed to coin conventional full hard materials.

Deforming the gasket layer 26 when the material is in the annealed condition allows greater flexibility in the selection of the particular configuration and size of the sealing bead deformations 30 for a given application beyond that which would be available if working with conventional full hard stainless steel gasket layer materials. The sealing beads 30 are formed such as by pressing, hydroforming, rubber pad forming, or coining wherein the sheet material is deformed through mechanical displacement of the sheet material out of its plane to yield the ridge-like sealing bead features 30.

The stopper layer 28 of FIG. 2 may likewise be fabricated of austemper-hardenable material as described above and likewise formed when in the annealed condition. The stopper layer 28 includes thickened stopper regions or stoppers 32 extending about the openings 18. The stoppers 32 have thicknesses greater than that of the layer 28 and serve to limit the amount of compression of the sealing beads 30. The stoppers 32 may be formed by simply folding the edges of the openings 18 upon themselves to yield stoppers 32 that are twice as thick as the layer 28, or the thickness may be reduced such as by swaging the material to yield a stopper height less than twice the thickness of the layer 28.

Figure 3:
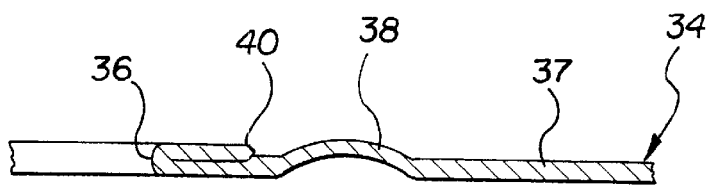
FIG. 3 is a cross-sectional view of an alternative single layer gasket according to the invention.

FIG. 3 illustrates an alternative single layer metal gasket 34 according to an alternative embodiment of the invention comprised of a single layer 37 of austemper-hardenable steel formed with similar openings including multiple cylinder openings 36. In this embodiment, the single layer 34 is formed both with sealing beads 38 and stopper formations 40 in the manner described above with respect to the multiple layers 26 and 28.

Figure 6:
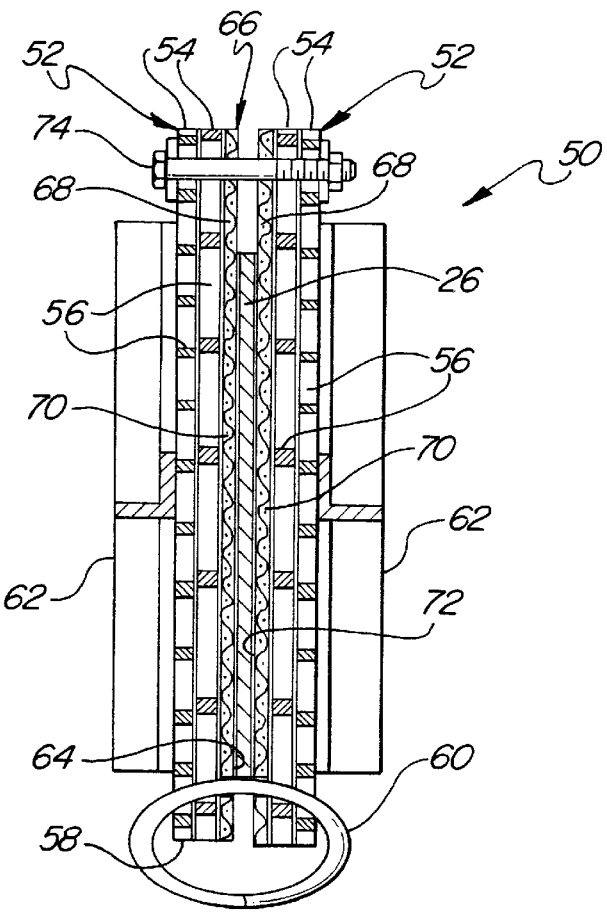
FIG. 6 is an enlarged cross-sectional view of the fixture of FIG. 4 supporting a gasket of the invention.

FIGS. 4–6 illustrate an austempering heat treat apparatus used in forming dimensionally stable, distortion-free austempered metal gaskets 10, 34 according to the invention. For purposes of simplicity, reference will be made to the treatment of the active layer 26 of the gasket 10, with it being understood that the same procedure is applicable for austempering the stopper layer 28 or the single layer 34.

FIG. 5 schematically illustrates an austempering apparatus 42 for use in the present invention. Included is a first open top salt bath 44 in which a bath of molten salt is maintained at the austenitizing temperature $T_1$. Immediately adjacent to the bath 44 is an isothermal bath 46 in which a bath of molten salt is maintained at the austempering temperature $T_2$. Following the isothermal bath 46 is a rinse bath 48 of water kept at about room temperature.

FIGS. 4 and 6 illustrate a fixture 50 used for supporting the gasket layer 26 during austempering. The fixture 50 includes a porous, rigid exoskeleton 52 fabricated of at least two opposed support panels 54 of expanded metal or the like having large openings 56 to permit the free flow of molten salt therethrough from all directions (i.e., from the sides, bottom and top). Suitable material for the support panels 54 may comprise, for example, commercially available ¾ inch expanded metal, 80% open. In the illustrated embodiment, two such panels 54 are provided on each side of the fixture 50 and are supported in contact with one another.

The support panels 54 are joined adjacent at the lower edge thereof in a way that secures them together, yet does not obstruct to a significant degree the ability of the molten salt media to flow freely into the fixture from the bottom or sides thereof. Suitable fasteners 60, such as loops of wire or rods passing through the openings 56 of the panels may be employed for joining the panels 54, preferably with ample space between the fasteners 60 to promote maximum fluid flow. The panels 54 may be further reinforced by an external support frame 62, which may comprise lengths of angle iron or the like secured to the opposed panel sections 54 to lend structural integrity without impairing significantly the free flow of the molten salt through the panels 54. Such support of the panels 54 provides a book-like fixture with the panel halves effectively hinged along their bottom edges allowing them to be moved toward and away from one another to close and open, respectively, a space 64 defined between them.

Within the space 64 is disposed a porous liner 66. The liner 66 preferably comprises a pair of opposed liner panels 68 or the like having openings relatively smaller than the openings 56 of the support panels 54. The liner panels 68 preferably comprise wire cloth of a gauge and mesh considerably finer than that of the expanded metal support panels 54. The wire cloth construction of the liner panels 68 may include between 4–16 wires per inch and having a wire diameter of about 0.08 inches. The liner panels 68 may be individually secured to the inside surfaces of the inner-most support panels 54 or separately joined along their bottom edges to provide the same book-like support of the liner panels 68 that pivot open and closed to define between them a fold 72 sized to receive and support the gasket layer 26.

In use, a formed gasket layer 26 is inserted from above into the fold 72 of the liner panels 68. The layer 26 may rest on the fasteners 60 to support the layer 26 from below within the fold 72. The panels 68, 54 are hinged closed and releasably secured such as by the provision of one or more additional fasteners 74 extending through the panels 68, 54 along the sides and/or top of the fixture 50 in laterally spaced relation to the layer 26, so as not to pass through or impeded lateral movement of the layer 26 within the fold 72. The liner panels 68 engage the opposite sides of the gasket layer 26 and, through reinforcement from the support panels 54 and frame 62, provide snug support to the gasket layer 26, firmly restraining the layer 26 against movement out of its plane, while permitting the layer 26 freedom to expand and move within its plane. Restraining the gasket layer 26 against movement out of its plane while permitting the layer 26 to move within its plane during heat treatment helps minimize the likelihood of warpage of the layer 26.

Once the gasket layer 26 is loaded, the fixture 50 is lowered into the first bath 44, whereupon the molten salt passes freely through the porous fixture 50 and contacts the gasket layer 26, heating the layer 26 and fixture 50 to the austenitizing temperature $T_1$. Referring to the diagram of FIG. 7, the fixture 50 is removed from the first bath 44 and lowered into the isothermal bath 46 in sufficient time to bypass the nose of the TTT curve (on the order of about 2–10 seconds). As the fixture 50 is raised from the first bath 44, the molten salt drains from the fixture 50. However, the relatively finer mesh openings 70 of the liner panels 68 provides a capillary effect which serves to retain some of the molten salt of the first bath 44 within the liner panels 68 against the sides of the gasket layer 26. The retained molten salt of the first bath 44 serves as a thermal buffer or barrier shielding the gasket layer 26 from the external environment. The molten salt barrier continually draws heat from the surrounding liners 54 and 68, serving to maintain the presence of the barrier, and thus the gasket layer 26 at or near the temperature of the first bath 44 during transport of the fixture 50 and gasket layer 26 to the subsequent isothermal bath 46. Such has the effect of prolonging the time available for bypassing the nose of the TTT curve (i.e., increases the available transportation time from the first bath 44 to the isothermal bath 46). In other words, the presence of the molten salt barrier effectively pushes the nose of the TTT curve to the right by holding the temperature of the gasket layer 26 at an austenitizing temperature during transport to the isothermal bath 46, thereby allowing for more time to reach the austempering temperature without passing through the nose of the TTT curve. The molten salt barrier further prevents the gasket layer 26 from cooling below the martensite start $M_s$ temperature during transport and further against uneven cooling across the surface of the gasket layer 26 that would contribute to warpage.

As the fixture 50 is plunged into the isothermal bath 46, the molten salt quickly enters the fixture 50 and contacts gasket layer 26, cooling it quickly to the $T_2$ austempering temperature, where it is held for sufficient time to transform the austenite to bainite. The liner 26 again serves as a thermal buffer, assuring that the gasket layer 26 is cooled uniformly so as to prevent localized hot or cold spots that would tend to warp the layer 26. Once the transformation to bainite is complete, the fixture is raised from the bath 46 and plunged into the rinse bath 48 to remove the salt.

Following austempering, the hardened gasket layer 26 is removed from the fixture 50 and further treated in the manner consistent with conventional gasket layers in the manufacture of metal gaskets. Such includes cleaning the layer 26 with a suitable detergent or etchant, coating the layer with a suitable nonmetallic coating, such as NBR, and assembling the layer 26 with other layers (in the case of a multi-layer gasket 10) according to conventional practice.

It will be appreciated that the austempering cycle relieves the gasket layer 26 from any residual forming stresses imparted to the gasket layer 26 during formation of the sealing bead 30, such that the resultant austempered layer 26 has substantially uniform strength and hardness across its surface. The same holds true for the stopper layer 28 and single layer 34 applications.

The disclosed embodiments are representative of presently preferred forms of the invention, and are intended to be illustrative rather than definitive thereof. The invention is defined in the claims.

I claim:

1. A metal gasket comprising:
   at least one metal plate layer having a generally flat, thin planer configuration formed with least one opening therethrough and including a deformation feature projecting from the plane of the layer in surrounding relation to said opening; and
   said layer being fabricated from austempered steel having a substantially bainitic microstructure.

2. The metal gasket of claim 1 wherein said layer comprises an active layer of a multi-layer gasket construction and said deformation feature comprises a sealing bead.

3. The metal gasket of claim 2 wherein said austempered steel comprises low alloy spring steel.

4. The metal gasket of claim 1 wherein said layer has a predetermined tensile strength and a predetermined fatigue strength, said fatigue strength of equal to about ½ the predetermined tensile strength.

5. The metal gasket of claim 1 wherein said layer comprises a single layer gasket and said deformation feature comprises a sealing bead surrounding said opening and a stopper surrounding said opening adjacent said sealing bead.

6. The metal gasket of claim 1 wherein said gasket layer is free of residual stresses imparted from the formation of said deformation feature.

7. A method of making a metal gasket comprising:
   providing a generally flat thin, gasket layer of austemperhardenable steel in an annealed condition;
   forming at least one opening in the layer and deforming the layer out of its plane to provide a deformation feature about the opening; and
   austempering the formed gasket layer to develop a substantially bainitic microstructure.

8. The method of claim 7 including supporting the layer in a porous fixture during austempering.

9. The method of claim 8 including restraining the gasket layer in the fixture against movement out of its plane while permitting the gasket layer to move within its plane.

10. The method of claim 8 including supporting the gasket layer on opposite sides with rigid porous panels.

11. The method of claim 10 including directly supporting the gasket layer on either side thereof with inner and outer porous screens, the inner screen having a relatively finer mesh as compared to the outer screen.

12. The method of claim 10 including supporting the metal layer on opposite sides thereof with a wire mesh panel having between 4 and 16 wires per inch and supporting the wire mesh panels on each side with a porous exoskeleton including relatively coarser panels of expanded metal.

13. The method of claim 8 including immersing the fixture and gasket layer in a first molten bath and heating both to an austenitizing temperature and thereafter removing the fixture and gasket layer from the first bath and immersing the fixture and gasket layer in an isothermal molten salt bath maintained at an austempering temperature and isothermally transforming the gasket layer from austenite to bainite.

14. The method of claim 13, including providing a fine mesh liner in the fixture adjacent the gasket layer and maintaining a protective barrier of molten salt from the first bath within pores of the liner in contact with the gasket layer during transport from the first bath to the isothermal bath.

15. The method of claim 14 including heating the molten salt barrier during transport with heat from the fixture to maintain the gasket layer at an elevated austenitizing temperature.

16. The method of claim 7 including relieving the gasket layer of residual forming stresses induced to the layer during formation of the deformation feature.

* * * * *